United States Patent
Lee et al.

(10) Patent No.: US 11,009,830 B2
(45) Date of Patent: May 18, 2021

(54) APPARATUS AND METHOD FOR HOLOGRAM IMAGE ACQUISITION

(71) Applicant: Electronics and Telecommunications Research Institute, Daejeon (KR)

(72) Inventors: Mun Seob Lee, Daejeon (KR); Gi Hyeon Min, Gwangju (KR); Byung-Tak Lee, Suwon-si (KR); Seihyoung Lee, Gwangju (KR); Dongsoo Lee, Yongin-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 580 days.

(21) Appl. No.: 15/843,830

(22) Filed: Dec. 15, 2017

(65) Prior Publication Data

US 2018/0307181 A1     Oct. 25, 2018

(30) Foreign Application Priority Data

Apr. 25, 2017   (KR) .......................... 10-2017-0053194

(51) Int. Cl.
*G03H 1/08*    (2006.01)
*G03H 1/04*    (2006.01)
*G03H 1/06*    (2006.01)

(52) U.S. Cl.
CPC .............. *G03H 1/0443* (2013.01); *G03H 1/06* (2013.01); *G03H 2001/0447* (2013.01); *G03H 2001/0452* (2013.01); *G03H 2001/0458* (2013.01); *G03H 2222/31* (2013.01); *G03H 2222/53* (2013.01); *G03H 2222/54* (2013.01);
(Continued)

(58) Field of Classification Search
CPC .......... G03H 1/04; G03H 1/0443; G03H 1/06; G03H 2001/0447; G03H 2001/0452; G03H 2001/0458; G03H 2001/0445; G03H 2222/00; G03H 2222/31; G03H 2222/53; G03H 2222/54; G03H 2223/00;
(Continued)

(56) References Cited

U.S. PATENT DOCUMENTS 6,057,970 A       5/2000  Kim et al.
2013/0335740 A1  12/2013  Ishimaru
(Continued)

FOREIGN PATENT DOCUMENTS

WO    2013086350 A1    6/2013
WO    2014204623 A1   12/2014

OTHER PUBLICATIONS

Kelner et al (Methods of Single Channel Digital Holography for 3-D imaging, IEEE Transactions on Industrial Informatics, vol. 12, No. 1, Feb. 2016, pp. 220-230) (Year: 2016).*

(Continued)

*Primary Examiner* — Stephone B Allen
*Assistant Examiner* — Jyotsna V Dabbi
(74) *Attorney, Agent, or Firm* — William Park & Associates Ltd.

(57) ABSTRACT

A hologram image acquiring apparatus includes a linear polarizer that filters incident light reflected by an object into a polarized component of a specific angle; a spherical lens that partially converts light that is incident through the linear polarizer to a spherical waveform; and a phase shifter that converts a part of the light incident through the spherical lens to a plane waveform having a respective phase per pixel unit.

8 Claims, 5 Drawing Sheets

(52) U.S. Cl.
CPC ..... *G03H 2223/19* (2013.01); *G03H 2223/22* (2013.01); *G03H 2225/32* (2013.01); *G03H 2226/13* (2013.01)

(58) Field of Classification Search
CPC ........... G03H 2223/13; G03H 2223/19; G03H 2223/22; G03H 2225/00; G03H 2226/13
USPC ................................ 359/1, 9, 30, 31, 10, 11
See application file for complete search history.

(56) References Cited

U.S. PATENT DOCUMENTS

2014/0135561 A1    5/2014  Song et al.
2015/0338633 A1*  11/2015  Li ........................... G02B 23/12
                                                        250/226

OTHER PUBLICATIONS

Brooker et al (Optimal Resolution in Fresnel incoherent correlation holographic fluorescence microscopy, Optics Express, vol. 19, No. 6, Mar. 2, 2011, pp. 5047-5062) (Year: 2011).*

Lee et al (Dual Detection confocal fluorescence microscopy: fluorescence axial imaging without axial scanning, Optics Express vol. 21, No. 15, Jul. 18, 2013, pp. 17839-17848) (Year: 2013).*

Kim et al (Full color natural light holographic camera, Optics Express, vol. 21, No. 8, Apr. 11, 2013, pp. 9636-9642) (Year: 2013).*

Rosen et al (Fluorescence incoherent color holography, Optics Express, vol. 15, No. 5, Mar. 5, 2007, pp. 2244-2250). (Year: 2007).*

Ichirou Yamaguchi, Tony Zhang, "Phase-shifting digital holography", Optics Letters vol. 22, No. 16, Aug. 15, 1997 pp. 1268-1270, Washington, D.C. 20036-1012 USA.

Joseph Rosen, Gary Brooker, "Non-scanning motionless fluorescence three-dimensional holographic microscopy", Nature Publishing Group, nature photonics vol. 2, Mar. 2008, pp. 190-195.

Myung K. Kim, "Full color natural light holographic camera", OSA Publishing, Apr. 22, 2013, vol. 21, No. 8, Nashington, D.C. 20036-1012 USA.

Roy Kelner, Joseph Rosen, and Gary Brooker, Enhanced resolution in Fourier incoherent single channel holography (FISCH) with reduced optical path difference, Optics Express, Aug. 26, 2013, vol. 21, No. 17, OSA Publishing, Washington, D.C. 20036-1012 USA.

Yuhong Wan, Tianlong Man, Dayong Wang, "Incoherent off-axis Fourier triangular color holography", OSA Publishing, Apr. 7, 2014, vol. 22, No. 7, Washington, D.C. 20036-1012 USA.

* cited by examiner

APPARATUS AND METHOD FOR HOLOGRAM IMAGE ACQUISITION

CROSS-REFERENCE TO RELATED APPLICATION

This application claims priority to and the benefit of Korean Patent Application No. 10-2017-0053194 filed in the Korean Intellectual Property Office on Apr. 25, 2017, the entire contents of which are incorporated herein by reference.

BACKGROUND (a) Field

An exemplary embodiment of the present invention relates to a hologram image acquiring apparatus and a method thereof.

(b) Description of the Related Art

Holography imaging is technology for recording 3-dimensional information of an object by acquiring phase information of the object as a single image. The holography imaging technology is typically divided into generation and regeneration, and generation (i.e., imaging) uses interference characteristics of light and regeneration (i.e., displaying) uses diffraction characteristics of light. In general, unlike photography that acquires image information through intensity of light reflected from an object or a subject, the holography imaging simultaneously acquires intensity of light reflected from an object or a subject and phase information so that complete 3-dimensional information of the object can be recorded.

Recently, digital holography adopting an electro-optical device, for example, a charge-coupled device (CCD) or a complementary metal-oxide semiconductor (CMOS) camera capable of digitally generating, reproducing, and restoring has been developed from holography imaging technology. Such a digital holography technology has been applied to various fields such as a high precision measurer, a high precision nondestructive inspection device, a 3-dimensional endoscope, a microscope, an automotive hub (HUB), a security device, and the like.

In general, a coherent light source having good coherency is used for generation of a digital phase optical image (or a hologram image). A laser is a representative coherent light source, and when the laser is used as a light source, 3-dimensional information of an object can be easily acquired since the light source has good coherency, but there is a limit in acquisition of an image such as a large-scaled object or a landscape and the laser is weak to vibration and expensive.

Accordingly, various research and development efforts have used an incoherent light source such as a light emitting diode (LED) or natural light for acquisition of a hologram image. When an incoherent light source is used to acquire a hologram image, the biggest problem is difficulty in acquisition of a coherent pattern of an object due to a strong DC noise and a twin image (or a reverse image) in acquisition of a hologram image using the incoherent light source.

A method for eliminating the twin image or DC noise from the hologram image includes an off-axis method wherein a hologram image is acquired by applying an angle to object light and reference light, and a phase shifting method that numerically removes DC noise by acquiring a plurality of hologram images, each having a respective phase.

When a hologram image is acquired by using the phase shifting method, a plurality of hologram images (e.g., four hologram images), each having a respective phase, are acquired by using a phase shifting element, and then the acquired plurality of hologram images are restored such that a hologram image having phase information of an object is acquired.

However, such a phase shifting method sequentially extracts a plurality of hologram images, and thus a relatively long period of time is consumed to acquire the hologram images, an expensive active device is required for phase shifting, and a phase value cannot be easily controlled.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a hologram image acquiring apparatus that can generate a hologram image in real time, and a method thereof.

A hologram image acquiring apparatus according to an exemplary embodiment of the present invention includes: a linear polarizer that filters incident light reflected by an object into a polarized component of a specific angle; a spherical lens that partially converts light that is incident through the linear polarizer to a spherical waveform; and a phase shifter that converts a part of the light incident through the spherical lens to a plane waveform having a respective phase per pixel unit.

The hologram image acquiring apparatus may further include a camera that acquires a hologram image of the object by picking up coherent light of the spherical wave and the plane wave interfering with each other through the phase shifter.

The hologram image acquiring apparatus may further include a focal lens that is provided between the object and the linear polarizer and converts light incident by being reflected by the object into a plane waveform.

The hologram image acquiring apparatus may further include a light source that irradiates light to the object.

The light source may be a coherent light source.

The light source may be an incoherent light source.

The linear polarizer may be a 45-degree linear polarizer.

Light passed through the linear polarizer may include a transverse magnetic (TM) mode (X-axis) polarized component and a TM mode (Y-axis) polarized component, and the spherical lens may transmit light having the TM mode (X-axis) component among incident light by converting the light into a spherical waveform.

The phase shifter may phase-shift light having the TM mode (Y-axis) among incident light.

The phase shifter may be formed of a passive element.

A hologram image acquiring apparatus according to another exemplary embodiment of the present invention includes: a beam splitter that makes light incident by being reflected by an object to process by splitting the light into a first path and a second path; an infrared ray filter that transmits light only in an infrared light area among light proceeded to the first path by the beam splitter; a linear polarizer that filters light passed through the infrared ray filter to a polarized component of a specific angle; a spherical lens that converts a part of light incident by passing through the linear polarizer into a spherical waveform; a phase shifter that converts a part of light incident by passing through the spherical lens into a plane waveform having a respective phase per pixel unit; a first camera that acquires a black-and-white hologram image of the object by picking up coherent light of the spherical waveform and the plane waveform interfering with each other through the phase shifter; and a second camera that acquires a colored image by picking up light proceeded to the second path by the beam splitter.

The hologram image acquiring apparatus may further include an image combiner that acquires a colored hologram image by combining the black-and-white hologram image and the colored image picked up by the first camera and the second camera.

The hologram image acquiring apparatus may further include a focal lens that is provided between the object and the beam splitter and converts light incident by being reflected by the object into a plane waveform.

The hologram image acquiring apparatus may further include a light source that irradiates light to the object.

The linear polarizer may be a 45-degree linear polarizer.

Light passed through the linear polarizer may include a transverse mode (TM) (Y-axis) polarized component, and the spherical lens may transmit light having the TM mode (X-axis) component among incident light by converting the light into a spherical waveform.

The phase shifter may phase-shift light having the TM mode (Y-axis) among incident light.

The phase shifter may be formed of a passive element.

According to the exemplary embodiment of the present invention, time consumed for phase shifting for noise elimination can be effectively shortened, thereby generating a hologram image in real time.

In addition, since an inexpensive phase shifting device is used, cost of a hologram image acquiring apparatus can be reduced.

DETAILED DESCRIPTION OF THE EMBODIMENTS

Figure 1:
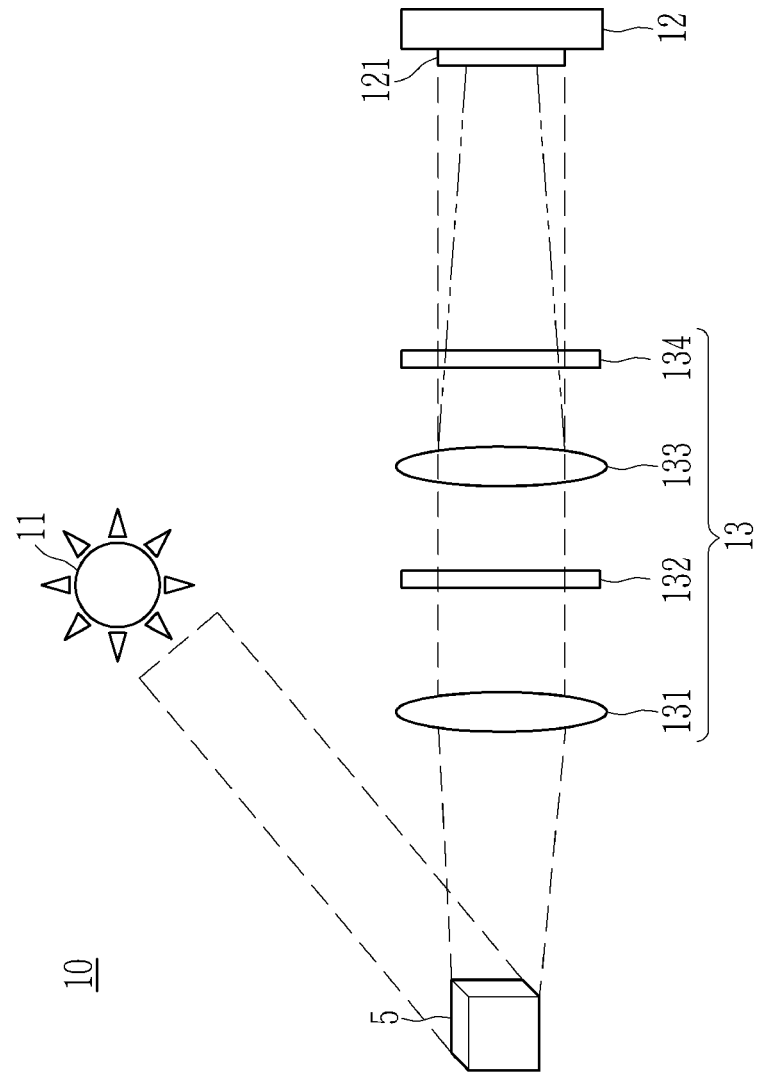
FIG. 1 schematically shows a hologram image acquiring apparatus according to a first exemplary embodiment.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

Hereinafter, a hologram image acquiring apparatus and a method thereof according to exemplary embodiments of the present invention will be described in detail with reference to the accompanying drawings.

Figure 2:
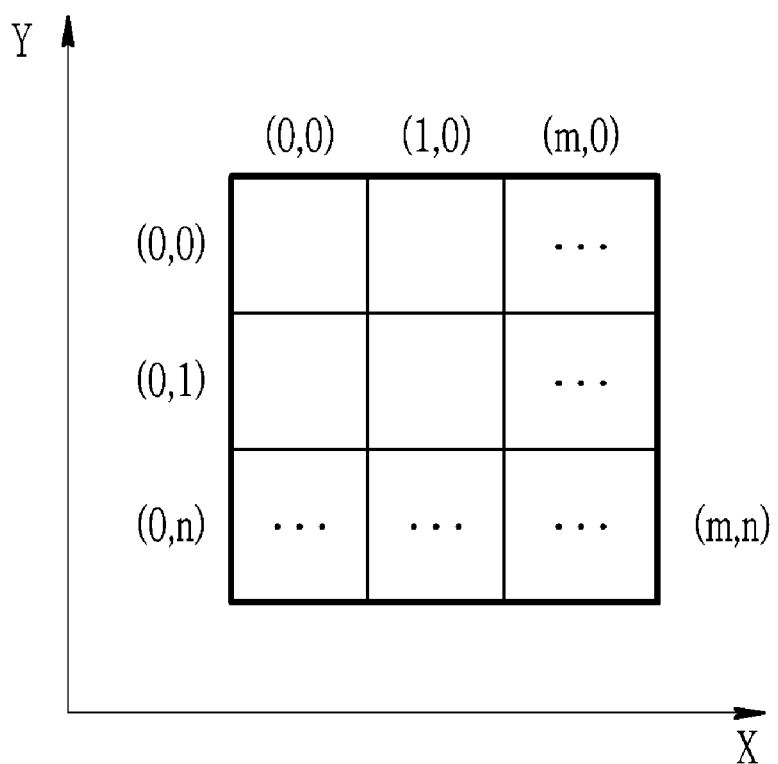
FIG. 2 is provided for description of pixel coordinates in a space coordinate system.

FIG. 1 schematically shows a hologram image acquiring apparatus according to a first exemplary embodiment. FIG. 2 is provided for description of pixel coordinates in a space coordinate system.

Referring to FIG. 1, a hologram image acquiring apparatus 10 according to the first exemplary embodiment may include a light source 11, a camera 12, and an optical system 13.

A coherent light source or an incoherent light source may be used as the light source 11. A laser may be used as the coherent light source, and a light emitting diode (LED), natural light, and the like may be used as the incoherent light source.

The camera 12 is an electro-optical camera, and may include an image sensor 121. The image sensor 121 may include a charge-coupled device (CCD) sensor or a complementary metal-oxide semiconductor (CMOS) sensor.

The camera 12 picks up light passed through the optical system 13 and input through the image sensor 121 to thereby acquire a hologram image.

The optical system 13 may include a focal lens 131, a linear polarizer 132, a spherical lens 133, and a phase shifter 134.

The focal lens 131 may convert light incident from an object 5 into a plane waveform. That is, light irradiated from the light source 11 or the natural light is reflected by the object 5 and thus scattered, and some of the scattered light is converted into the plane waveform through the focal lens 131.

The focal lens 131 may also be used to adjust a distance to the object 5. The focal lens 131 may be omitted depending on a distance to the object 5. For example, the focal lens 131 may be omitted in a Fresnel area where a distance between the object 5 and the optical system 13 is very close, like when using a microscope to view an object.

The linear polarizer 132 is a polarization filter, and may filter incident light passed through the focal lens 131 into a polarized component of a specific angle. For example, the linear polarizer 132 may filter light having a polarized component of 45 degrees among incident light.

The 45-degree polarized component is a combination of a transverse magnetic mode (TM mode) (i.e., X-axis) polarized component and a TM mode (Y-axis) polarized component, and light having the TM mode (X-axis) polarized component may be converted into a spherical waveform by the spherical lens 133 and the TM mode (Y-axis) polarized component may be converted into a plane waveform having a respective phase (or polarization) per pixel unit of the image sensor 131 by the phase shifter 134.

The spherical lens 133 may transmit some (light having the TM mode (x-axis) polarized component) of incident light passed through the linear polarizer 132 by converting it into a spherical waveform.

The phase shifter 134 may transmit some (light having the TM mode (Y-axis) polarized component) of incident light passed through the spherical lens 133 by converting it into a plane waveform having a respective phase (polarization) per pixel unit.

As the phase shifter 134, a transverse electric mode (TE mode) pixelated phase shifter may be used.

The phase shifter 134 may be manufactured through a semiconductor process, and a polarization characteristic may be used to make light passed through the phase shifter 134 have a respective phase value per pixel unit.

The phase shifter 134 may be implemented by using a transmission type spatial light modulator (SLM). The SLM may adjust a phase by using a polarization characteristic of each pixel. Thus, image resolution can be adjusted according to a distance to the object 5 by using the transmission type SLM.

As described above, light reflected by the object 5 is converted to a plane waveform and a spherical waveform having different phases while passing through the optical system 13, and the plane waveform and the spherical waveform converted by the optical system 13 can interfere with each other such that coherent light having phase information (i.e., 3-dimensional information) of the object 5 can be generated.

Hereinafter, a process through which the light reflected by the object 5 can be converted into the plane waveform and the spherical waveform while passing through the optical system 13 will be described in detail.

Light U(x,y) incident from the object 5 is converted as given in Equation 1 while passing through the focal lens 131 and the linear polarizer 132.

$$U(x,y;z) = U_{TM}(x,y;z) + U_{TE}(x,y;z) \quad \text{[Equation 1]}$$

In Equation 1, (x, y) denotes coordinates of the object 5, $U_{TM}(x, y; z)$ denotes a TM component, and $U_{TE}(x, y; z)$ denotes a TE component. Light of the TM component ($U_{TM}(x, y; z)$) and light of the TE component (UTE(x, y; z)) passed through the focal lens 131 and the linear polarizer 132 are incident on the spherical lens 133 as in the form of a plane wave.

The light of the TM component ($U_{TM}(x, y; z)$) is converted into a spherical waveform from the plane waveform while passing through the spherical lens 133 as given in Equation 2.

$$U_{TM}(x, y, z) = \frac{U_o}{2z} \exp\left(\frac{ikz}{d}(x^2 + y^2)\right) \exp(i\phi) \quad \text{[Equation 2]}$$

In addition, light of a TE component (UTE(x, y, z)) among light passed through the focal lens 131 and the linear polarizer 132 is phase-shifted per pixel unit as given in Equation 3 while passing through the phase shifter 134.

$$U_{TE}(x, y, m, n; z) = \frac{U_o(x, y)}{2} \exp(\phi(m, n)) \quad \text{[Equation 3]}$$

In Equation 3, m and n are pixel coordinates in an (x, y) space coordinate system, and may be represented as shown in FIG. 2.

Light of TM component ($U_{TM}(x, y; z)$) converted into the spherical waveform by the spherical lens 133 and the plane-wave light of the TE component ($U_{TM}(x, y; z)$) phase-shifted per pixel unit by the phase shifter 134 interfere with each other at a rear end of the optical system 13 and thus input into the image sensor 121 of the camera 12.

Here, intensity of the interfered light may be given as Equation 4.

$$I(x, y, ; z) = |U_{TM} + U_{TE}|^2 = \frac{1}{2}U_o^2 + 2U_o\cos(\phi(m, n) + \phi) \quad \text{[Equation 4]}$$

Here, $U_o$ denotes light incident from the object 5.

When light passed through the phase shifter 134 has phase values of 0, π/2π, and 3π/2 with respect to the respective pixels, phase information of the object 5 may be represented as given in Equation 5 based on Equation 4.

$$\phi(x, y) = \sum_{m,n=1} \tan^{-1}\left(\frac{I(x, y, m, n) - I(x, y, m-1, n)}{I(x, y, m, n-1) - I(x, y; m-1, n-1)}\right) \quad \text{[Equation 5]}$$

Accordingly, the hologram image acquiring apparatus 10 according to the exemplary embodiment can acquire 3-dimensional phase information of the object 5 through one image acquisition, and therefore a hologram image can be generated in real time. In addition, since the phase shifter used to eliminate DC noise and the reverse image is implemented as a passive element rather than an active element, the configuration of the hologram image acquiring apparatus 10 can be simple, thereby reducing cost and enabling low-power driving.

Meanwhile, in the first exemplary embodiment, the hologram image acquiring apparatus includes the camera 12, but the hologram image acquiring apparatus may include only the optical system 13 according to another exemplary embodiment of the present invention. In this case, the hologram image acquiring apparatus implemented to include a focal lens, a linear polarizer, a spherical lens, and a phase shifter may be attached to a camera of a smart phone and the like.

Figure 3:
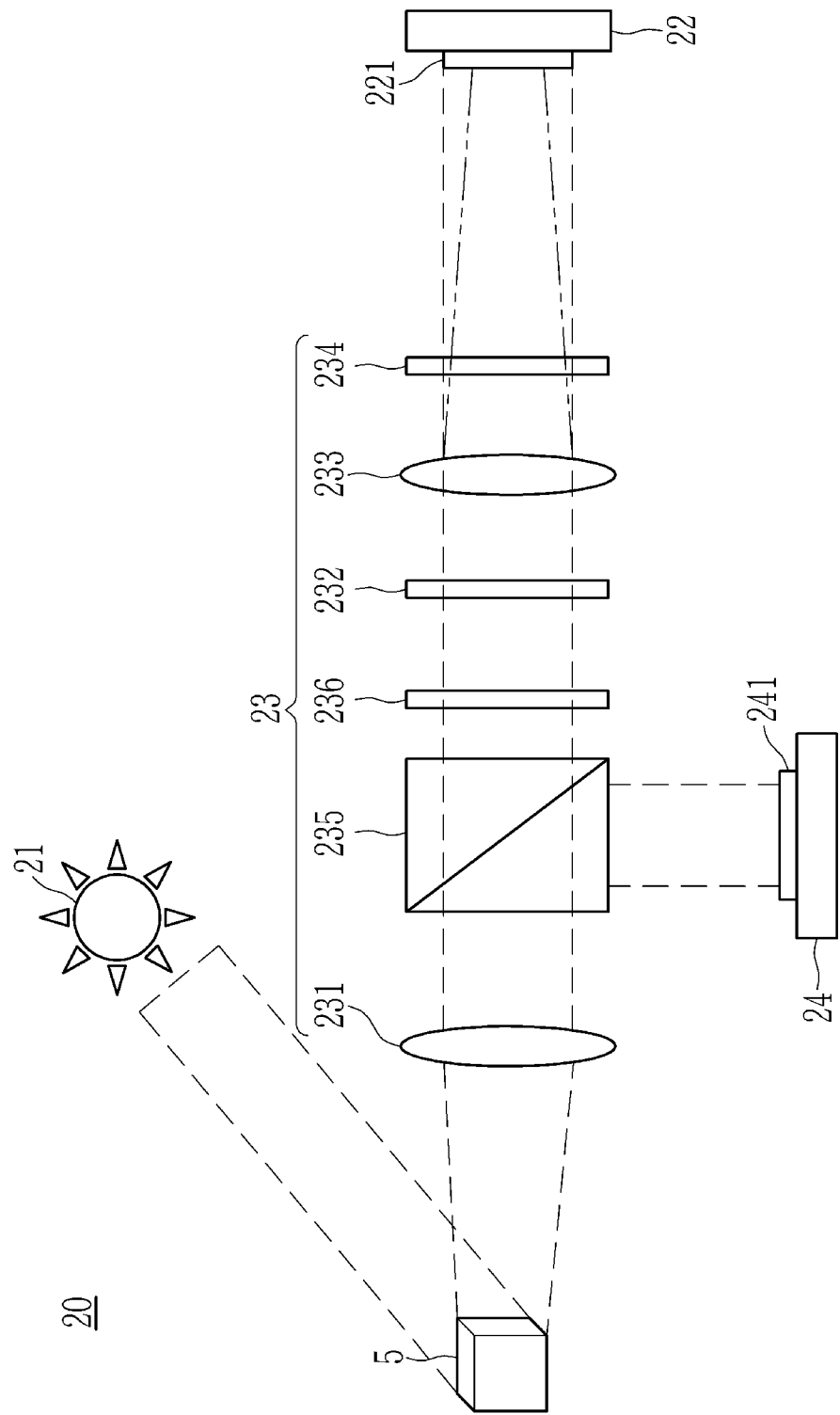
FIG. 3 schematically illustrates a hologram image acquiring apparatus according to a second exemplary embodiment.
Figure 4:
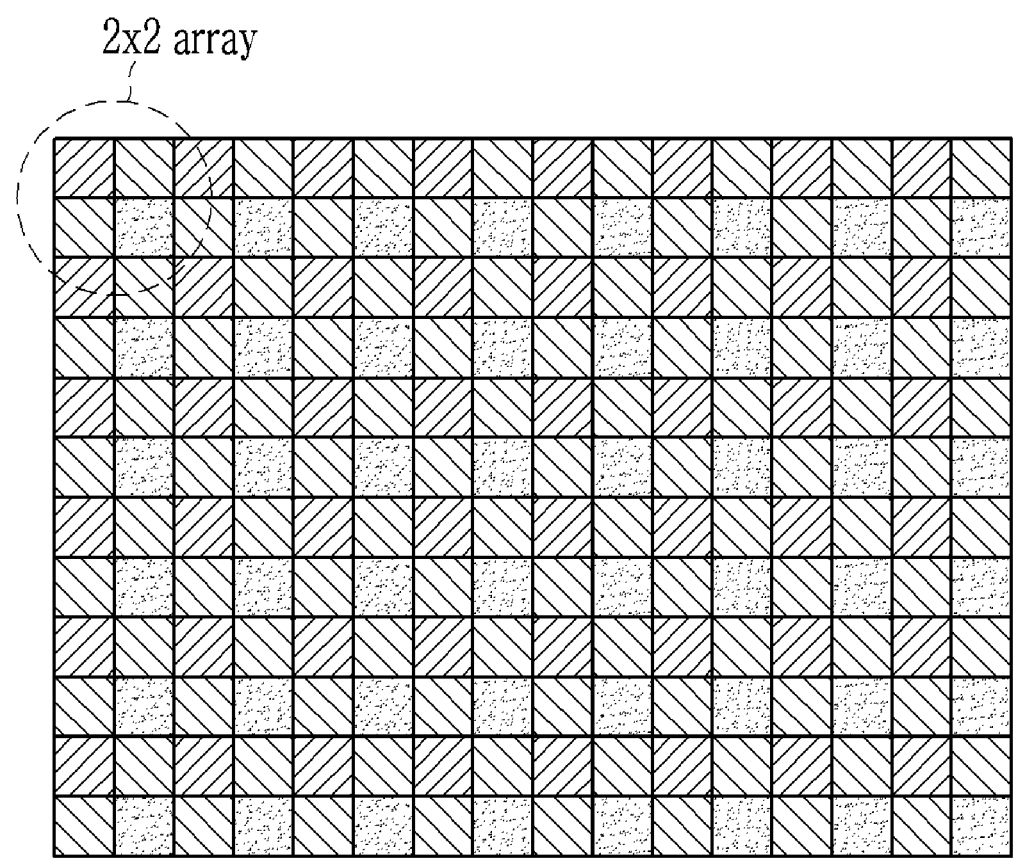
FIG. 4 shows an example of a Bayer pattern used in a color filter.

FIG. 3 schematically shows a hologram image acquiring apparatus 10 according to a second exemplary embodiment. In addition, FIG. 4 shows an example of a Bayer pattern used in a color filter.

Referring to FIG. 3, a hologram image acquiring apparatus 20 according to a second exemplary embodiment may include a light source 21, a black-and-white camera 22, an optical system 23, and a color camera 24.

A coherent light source or an incoherent light source may be used as the light source 21.

The optical system 23 may include a focal lens 231, a linear polarizer 232, a spherical lens 233, and a phase shifter 234. The focal lens 231 may convert light incident from an object 5 to a plane waveform.

The focal lens 231 may be used to adjust a distance to the object 5. The focal lens 231 may be omitted depending on a distance to the object 5. For example, the focal lens 231 may be omitted in a Fresnel area where a distance between the object 5 and the optical system 23 is very close, like when using a microscope to view an object.

The linear polarizer 232, which is a polarization filter, may filter light incident by passing the focal lens 231 into a polarized component of a specific angle. For example, the linear polarizer 232 may filter the incident light to only allow a polarized component of 45 degrees to pass.

The spherical lens 233 may transmit some (light having the TM mode (X-axis) polarized component) of incident light passed through the linear polarizer 232 by converting it into a spherical waveform.

The phase shifter 234 may transmit some (light having the TM mode (Y-axis) polarized component) of incident light passed through the spherical lens 233 by converting it into a plane waveform having a respective phase (polarization) per pixel unit.

A transverse electric mode (TE mode) pixelated phase shifter may be used as the phase shifter 234.

The phase shifter 234 may be manufactured through a semiconductor process, and may be implemented by using a spatial light modulator (SLM).

In general, in order to represent a color in an electro-optical camera, a color filter having a Bayer pattern is arranged on a black-and-white image sensor. As shown in FIG. 4, the Bayer pattern is formed of a 2×2 pixel array having a unit pixel of one red pixel, one blue pixel, and two green pixels. However, when the hologram image acquiring apparatus 10 of FIG. 1 is applied to acquire a colored hologram image, resolution may be significantly deteriorated Accordingly, the hologram image acquiring apparatus 20 according to the second exemplary embodiment acquires an image that shows 3-dimensional phase information of the object 5 in an infrared ray area through the black-and-white camera 22, acquires a colored image through the color camera 24, and combine the two images to thereby acquire a colored hologram image.

For this, the optical system 23 in the hologram image acquiring apparatus 20 according to the second exemplary embodiment may further include a beam splitter 235 and an infrared ray filter 236 disposed between the focal lens 231 and the linear polarizer 232.

The beam splitter 235 may serve to split light passed through the focal lens 231. For example, the beam splitter 235 reflects a part of incident light to make the part of the light proceed to an image sensor 241, and transmits another part of the incident light to make the other part of the light proceed to the linear polarizer 232.

The infrared filter 236 is disposed between the beam splitter 235 and the linear polarizer 232, and may transmit light only in the infrared ray area among light incident by being split by the beam splitter 235. Accordingly, only light in the infrared ray area can proceed to the linear polarizer 232, the spherical lens 233, the phase shifter 234, and the black-and-white camera 22, which are disposed at a rear end of the infrared ray filter 236.

When light of the infrared ray area passed through the optical system 23 is input through an image sensor 221, the black-and-white camera 22 picks up the input light to thereby acquire a black- and white hologram image including 3-dimensional phase image.

The black-and-white camera 22 is an electro-optical camera, and may include a black-and-white image sensor 221. The black-and-white image sensor 221 may include a CCD sensor or a CMOS sensor.

The color camera 24 may acquire a colored image by picking up incident light split by the beam splitter 235.

A black-and-white hologram image picked up by the black-and-white camera 22 and a colored image picked up by the color camera 24 may be combined as a colored hologram image by an image combining device (not shown).

Figure 5:
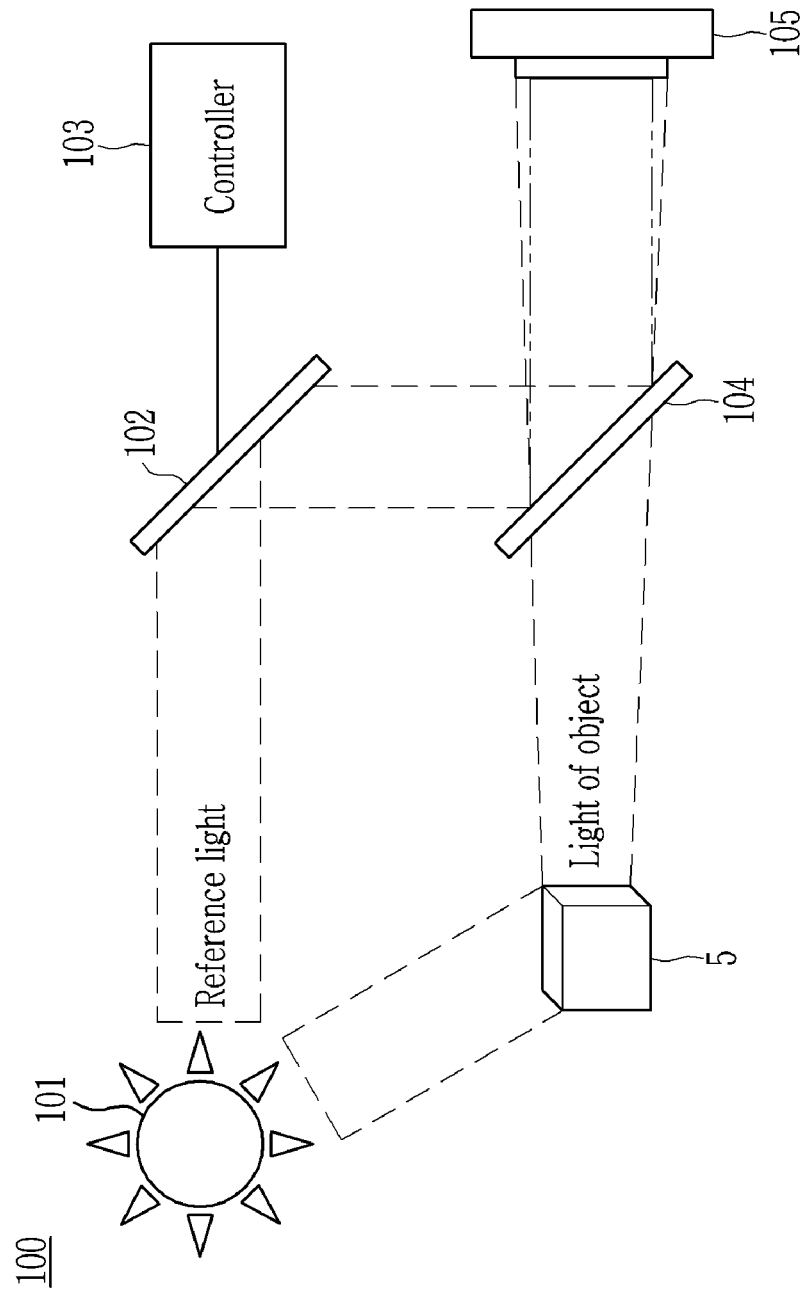
FIG. 5 shows an example of a hologram image acquiring apparatus according to a conventional art.

FIG. 5 shows an example of a hologram image acquiring apparatus according to a conventional approach.

Referring to FIG. 5, a hologram image acquiring apparatus 100 according to the conventional approach may include a light source 101, a phase shifter 102, a controller 103, a beam combiner 104, and a camera 105.

Light output from the light source 101 is divided into object light reflected by an object 5 and reference light, and they interfere with each other in the light combiner 104. In addition, light interfered with by the light combiner 104 is acquired as a hologram image by the camera 105.

In the hologram image acquiring apparatus 100 according to the conventional art, the phase shifter 102 formed of an active element is disposed on a path of the reference light, and the phase shifter 102 performs phase shifting with a plurality of stages according to an electrical signal input from the controller 103.

The controller 103 controls the electrical signal applied to the phase shifter 102 to control the phase shift stages performed by the phase shifter 102 to be sequentially changed for acquisition of a hologram image. Accordingly, a phase value of the reference value incident on the light combiner 104 is sequentially changed, and the camera 105 sequentially acquires a plurality of phase images, each having a respective phase value. The plurality of phase images, each having a respective phase value, acquired by the camera 105 are numerically combined into one hologram image, and a DC component is eliminated during such a process.

Equation 6 numerically represents a phase information acquiring method using four phase images, each having a respective phase value.

$$\phi(x, y) = \frac{I(x, y, 3\pi/2) - I(x, y, \pi/2)}{I(x, y, 0) - I(x, y, \pi)} \quad \text{[Equation 6]}$$

Referring to Equation 6, the phase shifter 102 needs to be sequentially adjusted to acquire phase information ($\varphi(x, y)$) to thereby acquire four phase images ($I(x, y, 0)$, $I(x, y, \pi/2)$, $I(x, y, \pi)$, and $I(x, y, 3\pi 2)$). In addition, a long period of time is consumed to sequentially change a phase shift value of the phase shifter 102 to 0, $\pi/2$, $\pi$, and $3\pi/2$.

Accordingly, a long period of time is consumed to acquire a final hologram image, and accordingly, it is almost impossible to acquire a hologram image in real time.

Further, the phase shifter 102 of which a phase shift value is electrically changed requires a power source (not shown) for generating an electrical signal and the controller 103, and is formed of an active element that is relatively expensive compared to a passive element.

On the contrary, the hologram image acquiring apparatuses 10 and 20 according to the above-described exemplary embodiments use a passive element that does not need a controller or a power source for phase shifting, and accordingly, they have a simple configuration and low cost compared to the hologram image acquiring apparatus according to the conventional art.

An exemplary embodiment of the present invention may not only be embodied through the above-described apparatus and/or method, but may also be embodied through a program that executes a function corresponding to a configuration of the exemplary embodiment of the present invention or through a recording medium on which the program is recorded, and can be easily embodied by a person of ordinary skill in the art from the description of the foregoing exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A hologram image acquiring apparatus comprising:
a beam splitter that makes light incident by being reflected by an object to process by splitting the light into a first path and a second path;
an infrared ray filter that transmits light only in an infrared light area among light proceeded to the first path by the beam splitter;
a linear polarizer that filters light passed through the infrared ray filter to a polarized component of a specific angle;
a spherical lens that converts a part of light incident on the linear polarizer into a spherical waveform;
a phase shifter that converts a part of light incident on the spherical lens into a plane waveform having a respective phase per pixel unit without using an electronic controller or power source to perform the conversion to the plane waveform having a respective phase per pixel unit;
a first camera that acquires a black-and-white hologram image of the object by picking up coherent light of the spherical waveform and the plane waveform interfering with each other through the phase shifter; and
a second camera that acquires a colored image by picking up light proceeded to the second path by the beam splitter.

2. The hologram image acquiring apparatus of claim 1, further comprising an image combiner that acquires a colored hologram image by combining the black-and-white hologram image and the colored image picked up by the first camera and the second camera.

3. The hologram image acquiring apparatus of claim 1, further comprising a focal lens that is provided between the object and the beam splitter and converts light incident by being reflected by the object into a plane waveform.

4. The hologram image acquiring apparatus of claim 1, further comprising a light source that irradiates light to the object.

5. The hologram image acquiring apparatus of claim 1, wherein the linear polarizer is a 45-degree linear polarizer.

6. The hologram image acquiring apparatus of claim 5, wherein light passed through the linear polarizer comprises a transverse mode (TM) (Y-axis) polarized component, and the spherical lens transmits light having the TM mode (X-axis) component among incident light by converting the light into a spherical waveform.

7. The hologram image acquiring apparatus of claim 6, wherein the phase shifter phase-shifts light having the TM mode (Y-axis) among incident light.

8. The hologram image acquiring apparatus of claim 7, wherein the phase shifter is formed of a passive element.

* * * * *